(12) United States Patent
Ruckart et al.

(10) Patent No.: US 7,925,991 B2
(45) Date of Patent: Apr. 12, 2011

(54) SYSTEMS, METHODS, AND ARTICLES OF MANUFACTURE FOR DISPLAYING USER-SELECTION CONTROLS ASSOCIATED WITH CLUSTERS ON A GUI

(75) Inventors: John Ruckart, Atlanta, GA (US); Robert Starr, Decatur, GA (US)

(73) Assignee: AT&T Intellectual Property, I, L.P., Atlanta, GA (US)

( * ) Notice: Subject to any disclaimer, the term of this patent is extended or adjusted under 35 U.S.C. 154(b) by 710 days.

(21) Appl. No.: 11/626,044

(22) Filed: Jan. 23, 2007

(65) Prior Publication Data

US 2008/0177774 A1 Jul. 24, 2008

(51) Int. Cl.
G06F 15/00 (2006.01)

(52) U.S. Cl. ........................ 715/811; 715/760

(58) Field of Classification Search .................. 715/803, 715/804, 805, 806, 807, 810, 817, 776, 777, 715/749, 760, 855, 708, 712, 811, 513, 501.1, 715/514, 517; 707/100, 101, 102; 370/338
See application file for complete search history.

(56) References Cited

U.S. PATENT DOCUMENTS

| | | | |
|---|---|---|---|
| 6,421,733 B1 * | 7/2002 | Tso et al. | 709/246 |
| 6,957,383 B1 * | 10/2005 | Smith | 715/207 |
| 7,149,698 B2 * | 12/2006 | Guheen et al. | 705/1 |
| 7,650,623 B2 * | 1/2010 | Hudgeons et al. | 725/136 |
| 2002/0145992 A1 * | 10/2002 | Holt | 370/338 |
| 2004/0064443 A1 * | 4/2004 | Taniguchi et al. | 707/3 |
| 2006/0101005 A1 * | 5/2006 | Yang et al. | 707/3 |
| 2006/0116926 A1 * | 6/2006 | Chen | 705/14 |
| 2006/0294226 A1 * | 12/2006 | Goulden et al. | 709/224 |
| 2007/0016563 A1 * | 1/2007 | Omoigui | 707/3 |
| 2007/0022010 A1 * | 1/2007 | Blaser et al. | 705/14 |
| 2007/0116036 A1 * | 5/2007 | Moore | 370/462 |
| 2007/0130109 A1 * | 6/2007 | King et al. | 707/2 |
| 2007/0225047 A1 * | 9/2007 | Bakos | 455/566 |
| 2007/0255754 A1 * | 11/2007 | Gheel | 707/104.1 |
| 2008/0201227 A1 * | 8/2008 | Bakewell et al. | 705/14 |
| 2008/0222170 A1 * | 9/2008 | Farnham et al. | 707/100 |
| 2008/0229182 A1 * | 9/2008 | Hendricks et al. | 715/205 |

OTHER PUBLICATIONS www.answers.com, cluster analysis: Definition and Much More from Answers.com, Jan. 23, 2007.
www.en.wikipedia.org, Data clustering—Wikipedia, the free encyclopedia, Jan. 23, 2007.
Wilson, Carol, Consumer takes Control—Telephony, Consumer takes Control, Nov. 6, 2006.

* cited by examiner

Primary Examiner — Steven P Sax
(74) Attorney, Agent, or Firm — Cantor Colburn LLP (57) ABSTRACT

Systems, methods, and articles of manufacture for displaying user-selection controls associated with clusters on a GUI are provided. One exemplary method includes automatically generating a first table having URLs associated with websites accessed by at least one user over a time interval and content information associated with the URLs. The method further includes automatically determining cluster names for grouping the URLs based on the content information. Each cluster name has at least one URL associated therewith. The method further includes automatically generating a second table having the cluster names and URLs associated with the cluster names. The method further includes displaying the GUI having the user-selection controls associated with the cluster names on a display device, utilizing the second table.

19 Claims, 5 Drawing Sheets

| KEY | DATE | SOURCE TYPE | SOURCE NAME | DURATION | PRIOR CLUSTER AND SUB CLUSTER NAME | SEARCH DATA | METADATA/SOURCE DATA/SEARCH RESULTS |
|---|---|---|---|---|---|---|---|
| 0110 | 06/20/06 | FAVORITE | LOCAL NEWS | 1.23 | NEWS | | NEWS, SPORTS, WEATHER, AJC.COM |
| 0111 | 06/20/06 | TAG | NEWS OF THE WEIRD | | | | NEWS, GOOGLE.COM/NOTW |
| 0112 | 06/21/06 | URL | NEWS.GOOGLE.COM | 2.35 | NEWS, WEATHER | | NEWS, WEATHER |
| 0113 | 06/22/06 | URL | NEWS.GOOGLE.COM | 3.45 | NEWS, STOCKS | | STOCK QUOTES, NEWS, STOCK CHARTS |
| 0114 | 06/23/06 | URL | NEWS.GOOGLE.COM | 4.87 | NEWS, WEATHER | | WEATHER, COZUMEL, TRAVEL |
| 0115 | 06/21/06 | COOKIE | MYBELLSOUTH.TXT | | ADS, GOOGLE | | AD, NEWS, BELLSOUTH.COM/DSL |
| 0116 | 06/21/06 | AD | TINYURL.COM/BLSDSL | | ADS | | BELLSOUTH DSL, BELLSOUTH.COM/DSL, PURCHASE |
| 0117 | 06/21/06 | SEARCH | GOOGLE.COM | 3.5 | | SCUBA, MEXICO VACATION, DIVEMEXICO.COM | GOOGLE.COM |
| 0118 | 07/01/06 | VIDEO | NEWS OF THE WEIRD | 3.45 | | | VIDEO, COMEDY, LONELYGIRL15, RATING 3.5, POSTED BY USER 575 |
| 0119 | 07/01/06 | VIDEO | YOUTUBE.COM | 4.87 | | | VIDEO, COMEDY, LONELYGIRL15, RATING 4.2, POSTED BY USER 989 |
| 0120 | 08/01/06 | VIDEO | YOUTUBE.COM | .23 | VIDEO | | VIDEO, LONELYGIRL15, RATING 6.8, POSTED BY USER LONELYGIRL15 |
| 0121 | 08/02/06 | VIDEO | VIDS.GOOGLE.COM | 1.23 | VIDEO | | VIDEO, COMEDY, ATLANTA, RATING 3.5, POSTED BY USER 123 |
| 0122 | 08/03/06 | VIDEO | VIDS.GOOGLE.COM | .57 | VIDEO | | VIDEO, AMAZING, FIRE, RATING 3.5, POSTED BY USER 456 |

| KEY | DATE | CLUSTER NAME | SUB CLUSTER NAME | CONTENT | DESTINATION TYPE | DESTINATION | WEIGHT FACTOR |
|---|---|---|---|---|---|---|---|
| 0210 | 06/20/06 | NEWS | STOCKS | STOCK QUOTES, CHARTS | URL | NEWS.GOOGLE.COM | 3.27 |
| 0211 | 06/20/06 | VACATION | SCUBA | DIVEMEXICO.COM | TAG | DIVEMEXICO.COM | 8.65 |
| 0212 | 06/21/06 | NEWS | AD | BELLSOUTH | URL | BELLSOUTH.COM/DSL | 6.78 |
| 0213 | 06/21/06 | NEWS | SPORTS | SCORES, SCHEDULE | URL | ESPN.COM | 7.57 |
| 0214 | 06/20/06 | NEWS | WEATHER | LOCAL WEATHER | URL | WEATHER.COM | 8.95 |
| 0215 | 07/01/06 | VIDEO | COMEDY | VIDEO | URL | VIDS.GOOGLE.COM | 3.27 |
| 0216 | 08/03/06 | VIDEO | AMAZING | VIDEO | URL | VIDS.GOOGLE.COM | 8.65 |
| 0217 | 08/01/06 | VIDEO | LONELYGIRL15 | VIDEO | URL | YOUTUBE.COM | 6.78 |

FIG. 3

- NEWS
  - WEATHER
  - STOCKS
  - AD
- VACATION
  - SCUBA
- VIDEO
  - COMEDY
  - AMAZING
  - LONELYGIRL15

SYSTEMS, METHODS, AND ARTICLES OF MANUFACTURE FOR DISPLAYING USER-SELECTION CONTROLS ASSOCIATED WITH CLUSTERS ON A GUI

FIELD OF INVENTION

The present application relates to systems, methods, and articles of manufacture for displaying user-selection controls associated with clusters on a graphical user interface (GUI).

BACKGROUND

Internet browsers allow a user to create a favorites list having icons associated with websites that they are interested in viewing at a later time. Further, the user can manually generate folders which contain portions of the favorites list. However, manually generating folders can be time consuming and an unproductive use of the user's time.

SUMMARY OF THE INVENTION

A method for displaying user-selection controls associated with clusters on a GUI in accordance with an exemplary embodiment is provided. The method includes automatically generating a first table having URLs associated with websites accessed by at least one user over a time interval and content information associated with the URLs. The method further includes automatically determining cluster names for grouping the URLs based on the content information. Each cluster name has at least one URL associated therewith. The method further includes automatically generating a second table having the cluster names and URLs associated with the cluster names. The method further includes displaying the GUI having the user-selection controls associated with the cluster names on a display device, utilizing the second table.

A system for displaying user-selection controls associated with clusters on a GUI in accordance with another exemplary embodiment is provided. The system includes a display device. The system further includes a computer operably communicating with the display device. The computer is configured to automatically generate a first table having URLs associated with websites accessed by at least one user over a time interval and content information associated with the URLs. The computer is further configured to automatically determine cluster names for grouping the URLs based on the content information. Each cluster name has at least one URL associated therewith. The computer is further configured to automatically generate a second table having the cluster names and URLs associated with the cluster names. The computer is further configured to display the GUI having the user-selection controls associated with the cluster names on the display device, utilizing the second table.

A computer readable medium having computer-executable instructions for performing a method for displaying user-selection controls on a GUI in accordance with another exemplary embodiment is provided. The method includes automatically generating a first table having URLs associated with websites accessed by at least one user over a time interval and content information associated with the URLs. The method further includes automatically determining cluster names for grouping the URLs based on the content information. Each cluster name has at least one URL associated therewith. The method further includes automatically generating a second table having the cluster names and URLs associated with the cluster names. The method further includes displaying the GUI having the user-selection controls associated with the cluster names on a display device, utilizing the second table.

DETAILED DESCRIPTION OF THE INVENTION

Figure 1:
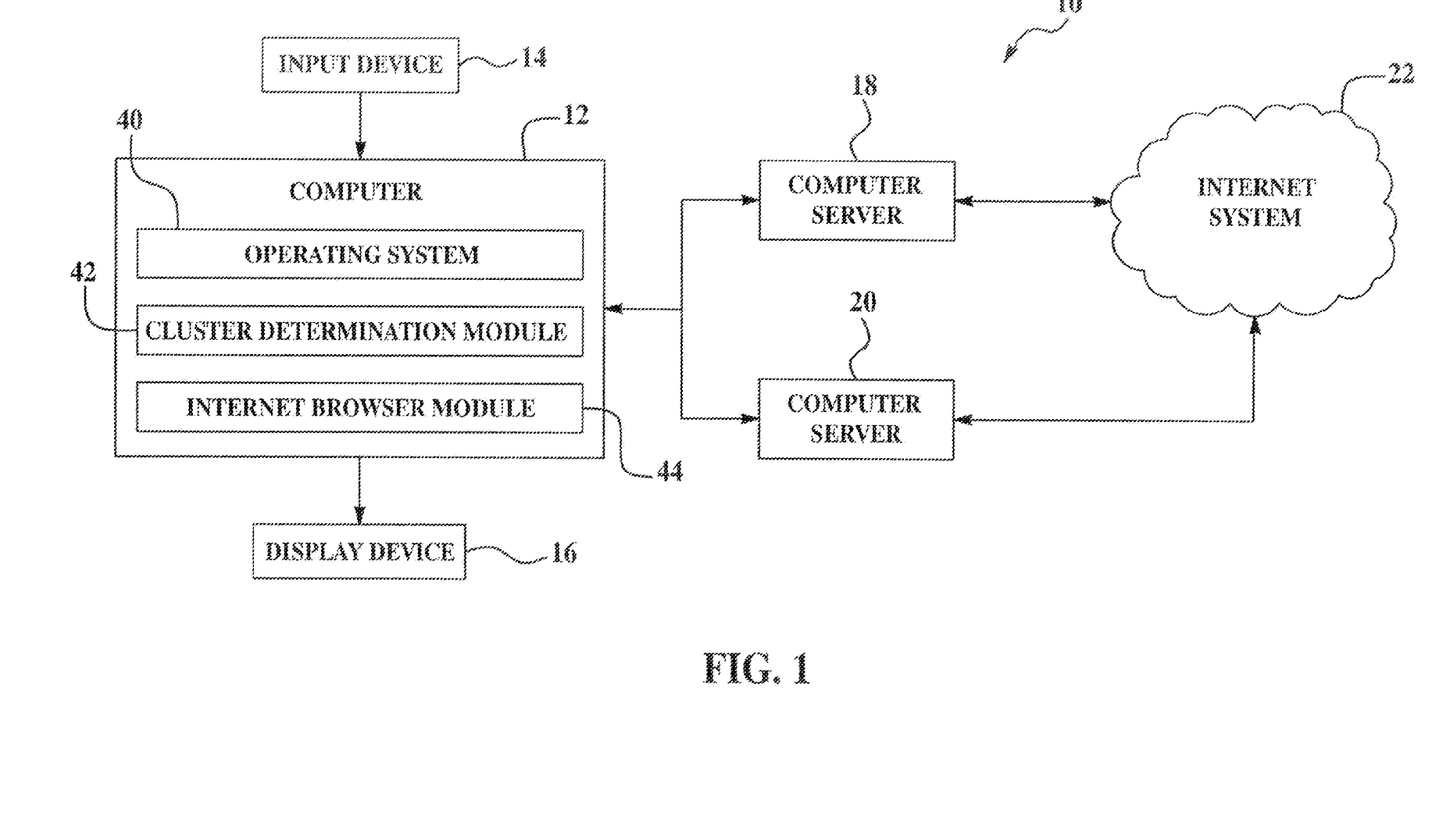
FIG. 1 is a schematic of a system for displaying user-selection controls associated with clusters on a GUI in accordance with an exemplary embodiment.

Referring to FIG. 1, a system 10 for displaying user-selection controls associated with clusters on a GUI is illustrated. The system 10 includes a computer 12, an input device 14, a display device 16, computer servers 18, 20, and an Internet system 22.

The computer 12 is provided to communicate with the Internet system 22 via the computer servers 18 and 20. In particular, a user can input a desired URL utilizing the input device 14 operably coupled to the computer 12. In response, the computer 12 can access the website associated with the inputted URL and display content associated with the website on the display device 16. The computer 12 executes an operating system 40, an Internet browser module 44, and a cluster determination module 42. The operating system 40 performs tasks for supporting operation of the Internet browser module 44 and the cluster determination module 42. The Internet browser module 44 is a software application that receives inputted URLs from the user and displays content associated with websites on a GUI on the display device 16. Further, the Internet browser module 44 allows a user to select hyperlinks on web pages to access other websites, and allows the user to input search terms into an Internet search engine to search for desired content. The cluster determination module 42 is a software application that automatically generates user-selection controls associated with URLs, based upon user selections utilizing the Internet Browser module 44, as will be described in further detail below.

Figure 2:
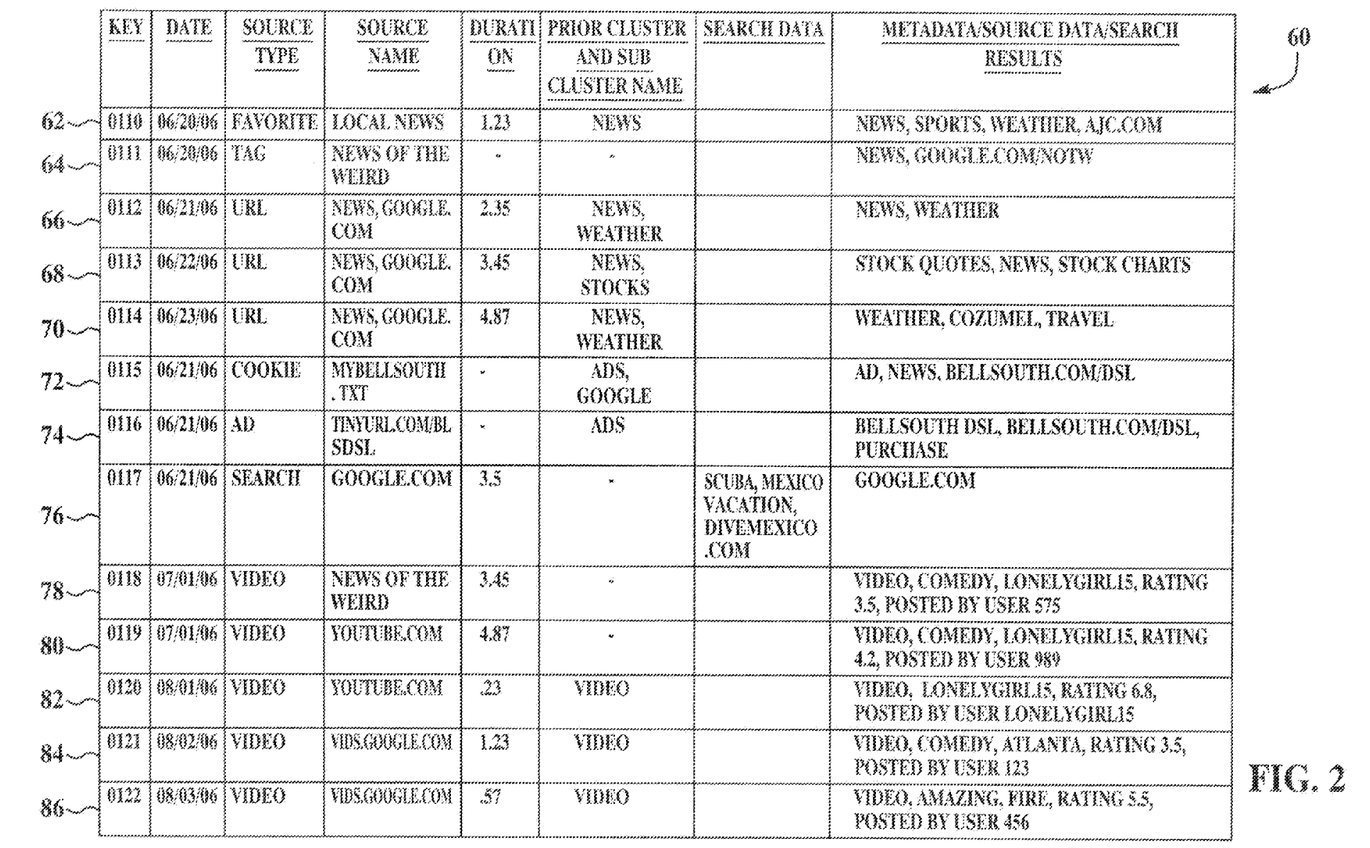
FIG. 2 is an exemplary table utilized by the system of FIG. 1.

Referring to FIG. 2, the cluster determination module 44 is configured to monitor user selections and to generate a first table storing information associated with the user selections. For example, the cluster determination module 44 can generate a tale 60 having URLs, tag identifiers, cookie identifiers, ad identifiers, search terms, favorite identifiers, and internet video identifiers accessed by a least one user utilizing the Internet browser module 44 over a time interval. In particular, the cluster determination module 42 generates cluster names and subcluster names for grouping URLs, tag identifiers, cookie identifiers, ad identifiers, search terms, favorite identifiers, and internet video identifiers, utilizing cluster analysis. Cluster analysis is a class of statistical techniques that can be applied to data that exhibits "natural" groupings. Cluster analysis sorts through the raw data and groups them into clusters. A cluster is a group of relatively homogeneous cases or observations. Objects in a cluster are similar to each other.

They are also dissimilar to objects outside the cluster, particularly objects in other clusters. In other words, cluster analysis is the partitioning of a data set into subsets (clusters), so that the data in each subset share some common trait—often proximity according to some defined distance measure. It should be noted that cluster analysis is known to those skilled in the art of statistical analysis and is used in many fields such as marketing, data mining and the social sciences. There are several factors that can be considered in such cluster analysis but the purpose is to divide a set of data into subsets wherein data of the same subset are alike and data of dissimilar subsets are not alike. A more detailed explanation of cluster analysis can be found at the following website http://en.wikipedia.org/wiki/Data_clustering whose contents are incorporated herein by reference in their entirety.

For purposes of discussion, a tag identifier is a website identifier or name that has been designated by a third party. A cookie identifier is a file name containing a cookie. An ad identifier is a file name associated with an internet advertisement or pop-up advertisement. A search term is text input into an Internet search engine. A favorite identifier is a name associated with a URL that is on a favorites list of a user. An internet video identifier is a name associated with a video file that can be streamed over the Internet. Further, the table 60 stores content information, including metadata, associated with the URLs, tag identifiers, cookie identifiers, ad identifiers, search terms, favorite identifiers, and internet video identifiers.

In one exemplary embodiment, the table 60 includes the records 62, 64, 66, 68, 70, 72, 74, 76, 78, 80, 82, 84, and 86 each having the following fields: (i) a key field, (ii) a data field, (iii) a source name field, (iv) a duration field, (v) prior cluster and subcluster name field, (vi) search data (vii) a metadata field/search results field. The key field contains a unique record identifier. The data field contains a calendar data that the record was generated. The source type field contains a description of a type of information source. For example, the source type field can contain the following descriptors: (i) favorite, (ii) tag, (iii) URL, (iv) cookie, (v) ad, (vi) search, and (vii) video. The source name field can contain (i) a URL associated with a website accessed by a user, (ii) a favorite name associated with a website accessed by a user, (iii) a file name associated with a cookie, (iv) a file name associated with a pop-up advertisement, or (v) an internet video file name or link thereto. The duration field contains a value indicating a number of minutes that a URL, a tag, a cookie, or a video was viewed by a user. The prior cluster and subcluster name field contains a name of a prior cluster or subcluster name associated with the source name. The search data field contains textural search terms input by a user when using an Internet search engine. The metadata/search results field can contain metadata associated with the URLs, tags, cookies or videos accessed by a user. For example, the record 82 has metadata "video, LonelyGirl15, rating 6.9, posted by User LonelyGirl15" associated with an internet video file, identified at Youtube.com. Further, the metadata/search results field can contain metadata associated with search results obtained from an Internet search engine. It should be noted that the table 60 is updated over time based upon user selections received by the Internet browser module 44.

Figure 3:
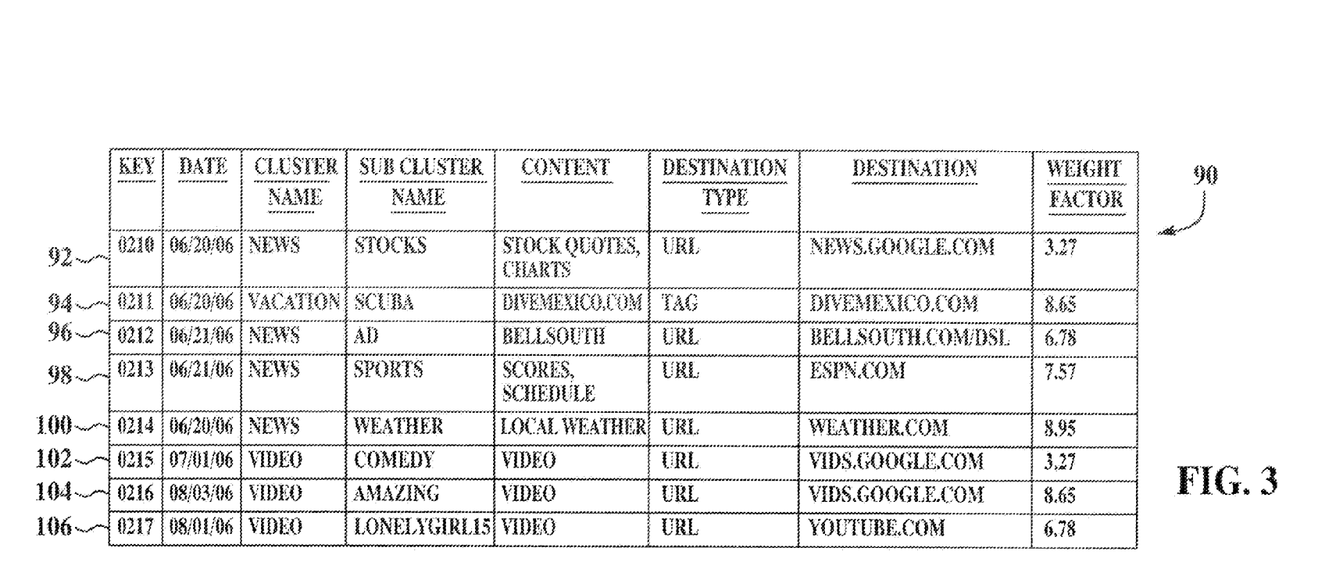
FIG. 3 is another exemplary table utilized by the system of FIG. 1.

Referring to FIGS. 1 and 3, the cluster determination module 42 is further configured to generate a second table having cluster names and subcluster names, generated based upon the information in a first table associated with user selections or requests initiated using the Internet browser module 44. For example, the cluster determination module 42 can generate a table 90 including records 92, 94, 96, 98, 100, 102, 104, and 106 having the following fields: (i) a key field, (ii) a data field, (iii) a cluster name field, (iv) a subcluster name field, (v) a content field, (vi) a destination type field, (vii) a destination field, and (viii) a weighting factor field. The key field contains unique record identifier. The date field contains a calendar date that the record was generated. The cluster name field contains a cluster name that is generated based upon the metadata of the table 60. The subcluster name field contains a subcluster name that is generated based upon the metadata of the table 60. The content field contains a textual description of the type of information that is available in URLs and tags associated with a specific cluster name and subcluster name. The destination type field can have a URL descriptor or a tag descriptor associated with the specific cluster name and subcluster name. The destination field contains a specific URL, cookie, ad, or video associated with the cluster name and the subcluster name. The weight factor field contains a weight factor value indicative of a level of importance or interest to a user of the specific content associated with a specific URL, cookie, ad, or video. The weight factor value can be calculated utilizing several parameters, including for example, a length of time an operator views a particular website, and a number of times an operator views particular website over a time period. The magnitude of the weight factor value is proportional to the level of importance or level of interest to the user of the specific content associated with the specific URL, cookie, ad, or video.

For purposes of understanding, a brief explanation of how one of the records in the table 90 is generated will be provided. For example, the record 92 of the table 90 can be generated utilizing the records 66, 68 in the table 60. In particular, the cluster name of "news" in record 92 can be obtained utilizing the term "news" in the metadata fields of records 66 and 68. The subcluster name of "stocks" in record 92 can be obtained utilizing the word "stock quotes" and "stock charts" in the metadata field of record 68. The destination type of "URL" in record 92 can be obtained utilizing the work "URL" in the records 66 and 68. The destination designation of "news.google.com" in record 92 can be obtained from the source name fields having "news.google.com" in the records 66, 68. The weight factor value of 3.27 in record 92 can be calculated utilizing at least the duration values 2.35 minutes and 3.45 minutes of records 66 and 68, respectively.

Figure 4:
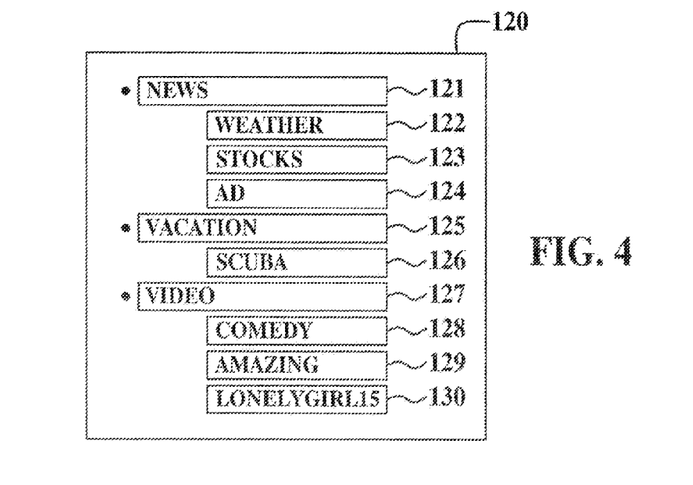
FIG. 4 is an exemplary GUI utilized by the system of FIG. 1.

Referring to FIG. 4, a graphical user interface (GUI) 120 that can be generated by the computer 12 and displayed on the display device 16 is illustrated. In particular, the GUI 120 can display user-selection controls 121, 122, 123, 124, 125, 126, 147, 128, 129, and 130 associated with the cluster names and subcluster names, respectively, of table 90. As shown, the GUI 120 displays the user-selection control 121 designated as "news" utilizing the cluster name of "news" in at least one of records 92, 96, 98, 100. Further, the GUI 120 displays the user-selection control 122 designated as "weather" utilizing the subcluster name of "weather" in record 100. Further, the GUI 120 displays the user-selection control 123 designated as "stocks" utilizing the subcluster name of "stock" in record 92. Further, the GUI 100 displays the user-selection control 124 designated as "ad" utilizing the subcluster name "ad" in the record 96. Further, the GUI 120 displays the user-selection control 125 designated as "vacation" utilizing the cluster name of "vacation" of record 94. Further, the GUI 120 displays the user-selection control 126 designated as "scuba" utilizing the subcluster name of "scuba" in record 94. Further, the GUI 120 displays the user-selection control 127 designated as "video" utilizing the cluster name of "video" in records 102, 104, and 106. Further, the GUI 120 displays the user-selection control 128 designated as "comedy" utilizing the subcluster name of "comedy" in record 102. Further, the GUI 120 displays the user-selection control 129 designated as "amazing" utilizing the subcluster name of "amazing" in record 104. Further, the GUI 120 displays the user-selection control 130 designated as "lonelygirl15" utilizing the subcluster name of "lonelygirl15" in record 106.

During operation, when a user selects the user-selection control 122 designated as "weather" of the GUI 120 utilizing the input device 14, the Internet browser module 44 accesses the website "weather.com" and displays the website on the display device 16. Further, when the user selects the user-selection control 123 designated as "stocks" of the GUI 120 utilizing the input device 14, the Internet browser module 44 accesses the website "news.google.com" and displays the website on the display device 16. Further, when the user selects the user-selection control 124 designated as "ad" of the GUI 120 utilizing the input device 14, the Internet browser module 44 accesses the file designated as "bellsouth.com/dsl" and displays the file contents on the display device 16. Further, when the user selects the user-selection control designated as "scuba" of the GUI 120 utilizing input device 14, the Internet browser module 44 accesses the website designated as "divemexico.com" and displays the website on the display device 16. Further, when the user selects the user-selection control designated as "comedy" of the GUI 120 utilizing input device 14, the Internet browser module 44 accesses the corresponding video file at "vids.google.com" and displays the file contents on the display device 16. Further, when the user selects the user-selection control designated as "amazing" of the GUI 120 utilizing input device 14, the Internet browser module 44 accesses the corresponding video file at "vids.google.com" and displays the file contents on the display device 16. Further, when the user selects the user-selection control designated as "lonelygirl15" of the GUI 120 utilizing input device 14, the Internet browser module 44 accesses the corresponding video file at "youtube.com" and displays the file contents on the display device 16.

Figure 5:
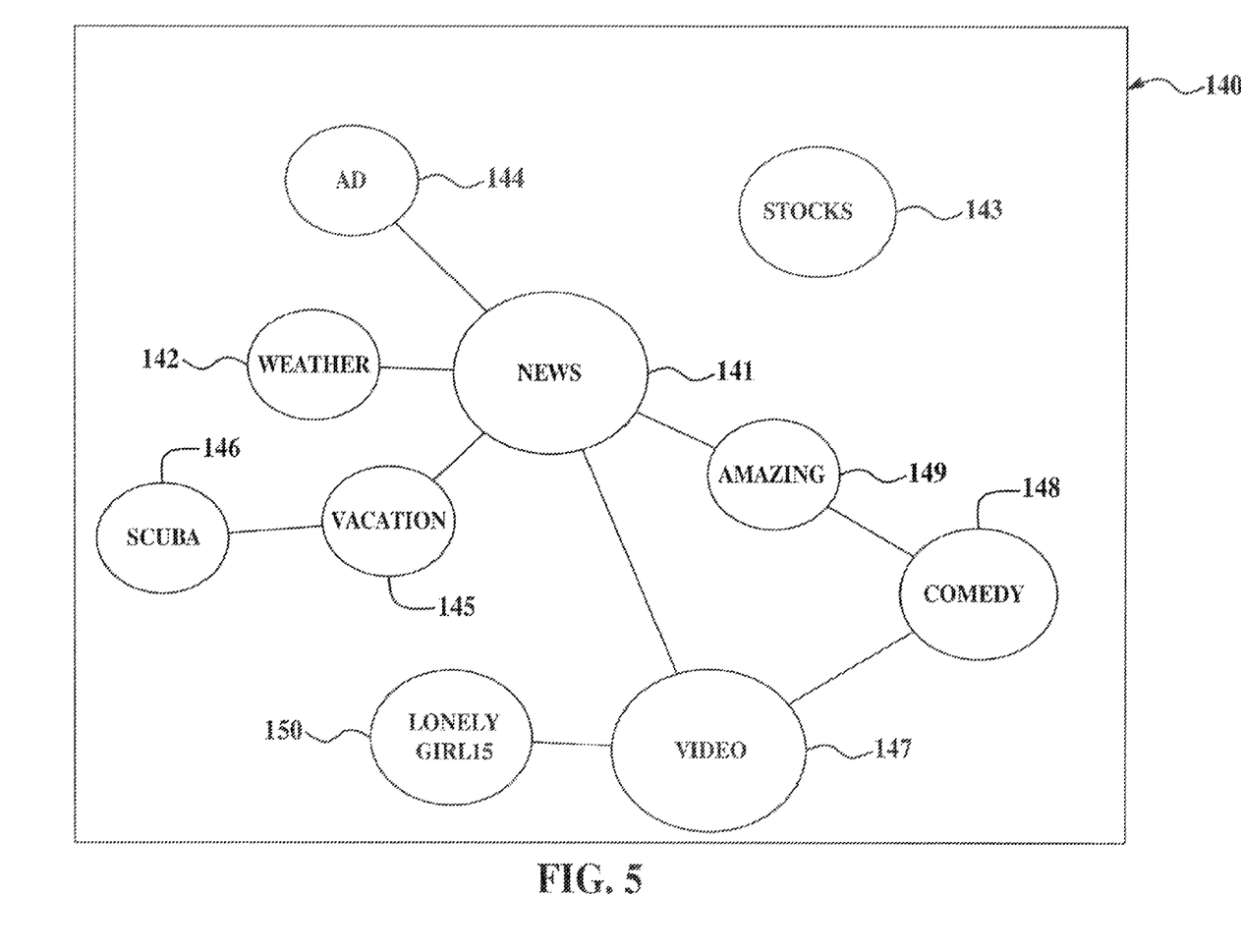
FIG. 5 is another exemplary GUI utilized by the system of FIG. 1.

Referring to FIG. 5, another GUI 140 that can be generated by the computer 12, instead of the GUI 120 and displayed on the display device 16, is illustrated. In particular, the GUI 140 can display user-selection controls 141, 145, 147 associated with cluster names "news", "vacation", and "video", respectively. Further, the GUI 140 can display user-selection controls 142, 143, 144, 146, 148, 149, and 150 associated with subcluster names "weather", "stocks", "ad", "scuba", "comedy", "amazing", and "lonelygirl15", respectively. During operation, the user can select a user-selection control utilizing the input device 14, and the Internet browser module 44 will access and display the associated corresponding website or file on the display device 16.

Referring to FIG. 1, the computer servers 18 and 20 are operably coupled between the computer 12 and the Internet system 22. The computer servers 18 and 20 allow the computer 12 to access content, specified by URLs, from the Internet system 22.

Figure 6:
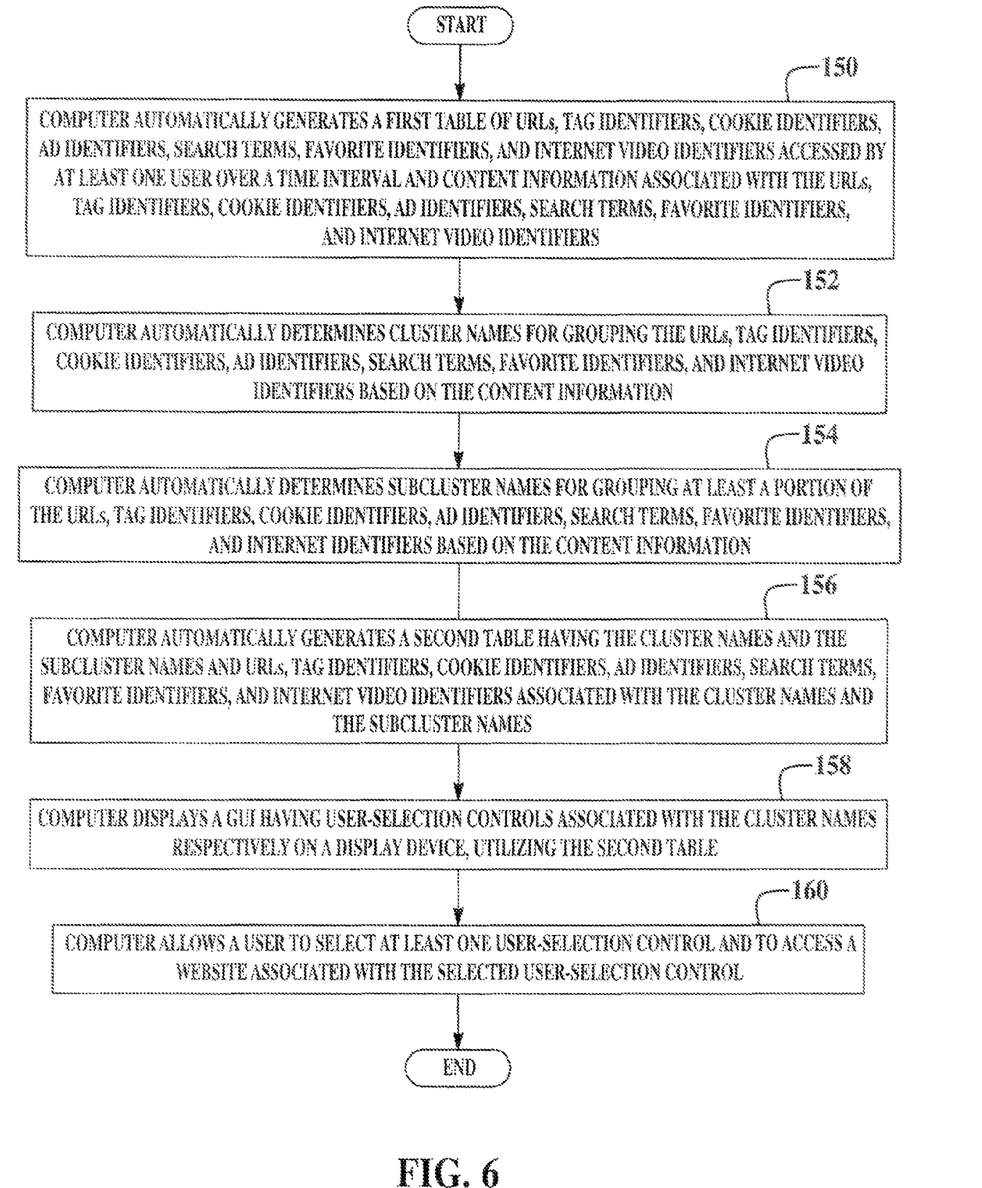
FIG. 6 is a method for displaying user-selection controls associated with clusters on a GUI in accordance with another exemplary embodiment.

Referring to FIG. 6, a method for displaying user-selection controls associated with clusters on a GUI will now be explained. The method can be implemented utilizing the system 10 including the subcluster determination module 42 and the Internet browser module 44 described above.

At operation 150, the computer 12 automatically generate a table 60 of URLs, tag identifiers, cookie identifiers, ad identifiers, search terms, favorite identifiers, and internet video identifiers accessed by at least one user over a time internal and content information associated with the URLs, tag identifiers, cookie identifiers, ad identifiers, search terms, favorite identifiers, and internet video identifiers.

At operation 152, the computer 12 automatically determines cluster names for grouping the URLs, tag identifiers, cookie identifiers, ad identifiers, search terms, favorite identifiers, and internet video identifiers based on the content information. Each cluster name has at least one following times associated therewith: a tag identifier, a cookie identifier, an ad identifier, a search term, a favorite identifier, and an internet video identifier.

At operation 154, the computer 12 automatically determines subcluster names for grouping at least a portion of the URLs, tag identifiers, cookie identifiers, ad identifiers, search terms, favorite identifiers, and interest video identifiers based on the content information. Each subcluster name has at least one following items assorted therewith: a tag identifier, a cookie identifier, an ad identifier, a search term, a favorite identifier, and an internet video identifier.

At operation 156, the computer 12 automatically generates a table 90 having the cluster names and the subcluster names and URLs, tag identifiers, cookie identifiers, ad identifiers, search terms, favorite identifiers, and internet video identifiers associated with the cluster names and the subcluster names.

At operation 158, the computer 12 displays the GUI 120 having user-selections controls associated with the cluster names and the subcluster names, respectively, on the display device 16, utilizing the table 90.

At operation 160, the computer 12 allows a user to select at least one user-selection control and to access a website associated with the selected user-selection control. After operation 162, the method is exited.

The systems, methods, and articles of manufacture for displaying user-selection controls associated with clusters on a GUI provides a substantial advantage over other systems and methods. In particular, the systems, methods, and articles of manufacture automatically generates cluster names for grouping URLs based upon user selections for viewing content on the Internet system, and displays user-selection controls on a GUI associated with the cluster names.

While the invention has been described with reference to exemplary embodiments, it will be understood by those skilled in the art that various changes may be made and equivalent elements may be substituted for elements thereof without departing from the scope of the invention. In addition, many modifications may be made to adapt a particular device or method to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another. Further, the use of the terms a, an, etc. do not denote a limitation of quantity, but rather denote the presence of at least one of the referenced items.

What is claimed is:

1. A method for displaying user-selection controls associated with clusters on a GUI, comprising:
    automatically generating a first table having URLs associated with websites accessed by at least one user over a time interval and content information associated with the URLs, the content information including metadata defining a category for the URLs, the first table generated by monitoring URLs selected by the user and generating the first table in response to the user selections;

automatically determining cluster names for grouping the URLs in the first table based on the content information including the metadata, each cluster name having at least two URLs associated therewith; and automatically generating a second table from the first table, the second table having the cluster names and URLs associated with the cluster names, the second table including a weight factor for each cluster name, the weight factor being derived in response to the length of time the user views websites associated with a cluster name; and displaying the GUI having the user-selection controls associated with the cluster names on a display device, utilizing the second table.

2. The method of claim 1, further comprising:

selecting one user-selection control associated with one cluster name on the GUI; and accessing a website associated with the selected user-selection control.

3. The method of claim 1, further comprising automatically determining subcluster names for grouping at least a portion of the URLs, each subcluster name being associated with at least one cluster name, the second table further having the subcluster names.

4. The method of claim 3, wherein displaying the GUI further comprises displaying the user-selection controls associated with the subcluster names on the GUI, utilizing the second table.

5. The method of claim 4, further comprising:

selecting one user-selection control associated with one cluster name or one user-selection control associated with one subcluster name; and accessing a website associated with the selected user-selection control.

6. The method of claim 1, wherein automatically generating the first table includes automatically generating the first table having URLs and at least one of tag identifiers, cookie identifiers, ad identifiers, search terms, favorite identifiers, and internet video identifiers accessed by the at least one user, the first table further having content information associated with the URLs and content information associated with at least one of the tag identifiers, cookie identifiers, ad identifiers, search terms, favorite identifiers, and internet video identifiers.

7. The method of claim 1, wherein at least one of the URLs is associated with an internet video file.

8. A system for displaying user-selection controls associated with clusters on a GUI, comprising:

a display device; and a computer operably communicating with the display device, the computer configured to automatically generate a first table having URLs associated with websites accessed by at least one user over a time interval and content information associated with the URLs, the content information including metadata defining a category for the URLs, the first table generated by monitoring URLs selected by the user and generating the first table in response to the user selections, the computer further configured to automatically determine cluster names for grouping the URLs in the first table based on the content information including the metadata, each cluster name having at least two URLs associated therewith, the computer further configured to automatically generate a second table from the first table, the second table having the cluster names and URLs associated with the cluster names, the second table including a weight factor for each cluster name, the weight factor being derived in response to the length of time the user views websites associated with a cluster name, the computer further configured to display the GUI having the user-selection controls associated with the cluster names on the display device, utilizing the second table.

9. The system of claim 8, wherein the computer is further configured to allow a user to select one user-selection control associated with one cluster name on the GUI, the computer further configured to access a website associated with the selected user-selection control.

10. The system of claim 8, wherein the computer is further configured to automatically determine subcluster names for grouping at least a portion of the URLs, each subcluster name being associated with at least one cluster name, the second table further having the subcluster names.

11. The system of claim 10, wherein the computer is further configured to display the user-selection controls associated with the subcluster names on the GUI, utilizing the second table.

12. The system of claim 11, wherein the computer is further configured to allow a user to select one user-selection control associated with one cluster name or one user-selection control associated with one subcluster name, the computer further configured to access a website associated with the selected user-selection control.

13. The system of claim 8, wherein the computer is further configured to automatically generate the first table having URLs and at least one of tag identifiers, cookie identifiers, ad identifiers, search terms, favorite identifiers, and internet video identifiers accessed by the at least one user, the first table further having content information associated with the URLs and content information associated with at least one of the tag identifiers, cookie identifiers, ad identifiers, search terms, favorite identifiers, and internet video identifiers.

14. The system of claim 8, wherein at least one of the URLs is associated with an interne video file.

15. A non-transitory computer readable storage medium having computer-executable instructions for performing a method for displaying user-selection controls on a GUI, comprising:

automatically generating a first table having URLs associated with websites accessed by at least one user over a time interval and content information associated with the URLs, the content information including metadata defining a category for the URLs, the first table generated by monitoring URLs selected by the user and generating the first table in response to the user selections;

automatically determining cluster names for grouping the URLs in the first table based on the content information including the metadata, each cluster name having at least two URLs associated therewith; and automatically generating a second table from the first table, the second table having the cluster names and URLs associated with the cluster names, the second table including a weight factor for each cluster name, the weight factor being derived in response to the length of time the user views websites associated with a cluster name; and displaying the GUI having the user-selection controls associated with the cluster names on a display device, utilizing the second table.

16. The computer readable storage medium of claim 15, wherein the method further comprises:

selecting one user-selection control associated with one cluster name on the GUI; and accessing a website associated with the selected user-selection control.

17. The computer readable storage medium of claim 15, wherein the method further comprises automatically determining subcluster names for grouping at least a portion of the URLs, each subcluster name being associated with at least one cluster name, the second table further having the subcluster names.

18. The computer readable storage medium of claim 17, wherein displaying the GUI further comprises displaying the user-selection controls associated with the subcluster names on the GUI, utilizing the second table.

19. The computer readable storage medium of claim 18, wherein the method further comprises:
   selecting one user-selection control associated with one cluster name or one user-selection control associated with one subcluster name; and
   accessing a website associated with the selected user-selection control.

* * * * *